United States Patent Office 3,654,335
Patented Apr. 4, 1972

3,654,335
PROCESS FOR THE PREPARATION OF POLYHALOALKYL CHLOROSULFATES
David E. Young, Denville, Lowell R. Anderson, Parsippany, and William B. Fox, Morristown, N.J., assignors to Allied Chemical Corporation, New York, N.Y.
No Drawing. Filed Nov. 29, 1968, Ser. No. 780,261
Int. Cl. C07c *143/68*
U.S. Cl. 260—456 R                    21 Claims

ABSTRACT OF THE DISCLOSURE

Chlorosulfates of the formula:

$$R[OSO_2Cl]_n$$

wherein $n$ is 1 or 2; R may be an open chain YZ-perhaloalkyl group when $n$ is 1 or an open-chain YZ-perhaloalkylene group containing at least three carbon atoms when $n$ is 2, wherein Y and Z are substituents on the R moiety and are the same or different electronegative groups; may be prepared by reacting hypochlorites of the formula R—$(OCl)_n$ wherein R and $n$ are as defined above, with sulfur dioxide at a temperature below about 0° C. The chlorosulfate products are a known class of compounds and are useful as intermediates for the preparation of halogenated ketones, carboxylic acids, esters, thiolesters, amides, aldehydes and polyesters.

CROSS REFERENCES TO RELATED APPLICATIONS (1) Copending application of D. E. Gould, L. R. Anderson and W. B. Fox, entitled "Novel Perhaloorgano Hypochlorites and Process for the Preparation Thereof," Ser. No. 734,515, filed June 5, 1968.

(2) Copending application of D. E. Gould, D. E. Young, L. R. Anderson and W. B. Fox, entitled "Novel Tertiary Polyhaloalkyl Hypochlorites and Process for the Preparation Thereof," Ser. No. 772,037, filed Oct. 30, 1968.

BACKGROUND OF THE INVENTION

Polyhalogenated alkyl chlorosulfates are a known class of compounds having been disclosed in U.S. Pats. 3,238,-240; 3,238,241; 3,248,419 and 3,254,107. These chlorosulfate products are useful intermediates to produce halogenated ketones, carboxylic acids, esters, thiolesters, amides, ketones, aldehydes and polyesters.

The method disclosed in the above-mentioned patents for preparing the chlorosulfate products is by the reaction of halogenated alkyl iodides with chlorosulfonic acid. Unfortunately, polyhalogenated alkyl iodides are expensive to prepare. Chlorosulfonic acid is also a relatively expensive starting material. Further, chlorosulfonic acid is involatile at room temperature and cannot be handled under such conditions in vapor phase.

It is a major object of the invention to provide a novel method for preparing certain polyhalogenated alkyl chlorosulfates from relatively inexpensive starting materials.

It is a further object of the invention to provide a novel method for preparing certain polyhalogenated alkyl chlorosulfates from reactants which can be readily handled in vapor phase thereby permitting a flow reaction process.

Other objects and advantages of the invention will become apparent from the following description.

SUMMARY OF THE INVENTION

We have discovered that chlorosulfates having the formula $$R-[OSO_2Cl]_n \quad (I)$$

wherein $n$ is 1 or 2; R is an open chain YZ-perhaloalkyl group when $n$ is an open-chain yz-perhaloalkylene group containing at least three carbon atoms when $n$ is 2, wherein Y and Z are substituents on the R moiety and are the same or different electronegative groups; may be prepared by reacting hypochlorites of the formula $$R-(OCl)_n \quad (II)$$

wherein R and $n$ are as defined above, with sulfur dioxide ($SO_2$) at temperatures below about 0° C.

The reaction of the hypochlorite starting materials of Formula II with sulfur dioxide under the above-described conditions to produce the desired chlorosulfates was unexpected in view of the fact that attempted reaction, under the same conditions, of $SO_2$ with the corresponding known hypofluorites which would be expected to be more reactive towards $SO_2$, is negative, that is to say no reaction takes place.

DETAILED DESCRIPTION AND THE PREFERRED EMBODIMENTS

With reference to the starting materials of Formula I above, the Y and Z substituents may be the same or different electronegative groups. This is not a critical portion of the molecule, however, as the electronegative groups do not enter into the reaction. Examples of electronegative groups are as follows: $FSO_2$ $FSO_3$, $NO_2$, halogen, perfluoroalkyl, perfluorocycloalkyl and perfluoroaryl. Those of ordinary skill in the art will readily be able to conceive of and incorporate other electronegative groups which can serve as Y and Z substituents.

Preferably, Y and Z are both halogen atoms, particularly fluorine.

The term open chain, as used herein, is intended to include any straight chain or branched chain structure. Branched chain structures may include secondary or tertiary branched chain structures.

Preferred starting materials are those which contain a minimum number of fluorine atoms which is at least equal to one half the total number of halogen atoms and electronegative groups present in the molecule. When all halogen atoms in the starting material are selected from the group consisting of F and Cl, the number of fluorine atoms is at least equal to one half the total number of fluorine and chlorine atoms in the molecule.

Subject to the indicated proviso in the definition of the chlorosulfate products, the preferred number of carbon atoms in the R group is from 1–15. Compounds in which the R group contains more than 15 carbon atoms may be prepared, however, and exhibit the same properties.

As can be seen from Formula I, when $n$ is 1, a class of monochlorosulfates is defined. When $n$ is 2, a class of dichlorosulfates is formed. When $n$ is 1 and R is a YZ-perhaloalkyl group, R preferably contains from 1–6 carbon atoms and still preferably from 1–3 carbon atoms. When $n$ is 2, the R group preferably contains from 3–10 carbon atoms and still preferably from 3–6 carbon atoms.

Preferably all halogen atoms in the starting compound molecules are selected from F and Cl and still preferably, all the halogen atoms in the molecules are F.

Illustrative compounds which may be prepared in accordance with the invention are as follows:

$$CF_3OSOCl \qquad F-\underset{\underset{CF_2Cl}{|}}{\overset{\overset{CF_3}{|}}{C}}-OSO_2Cl$$

$$C_2F_5OSO_2Cl \qquad CF_3-CF_2-\underset{\underset{CF_2F}{|}}{\overset{\overset{CCl_2F}{|}}{C}}F-OSO_2Cl$$

$$F-\underset{\underset{CF_3}{|}}{\overset{\overset{CF_3}{|}}{C}}-OSO_2Cl \qquad n-C_3F_7OSO_2Cl$$

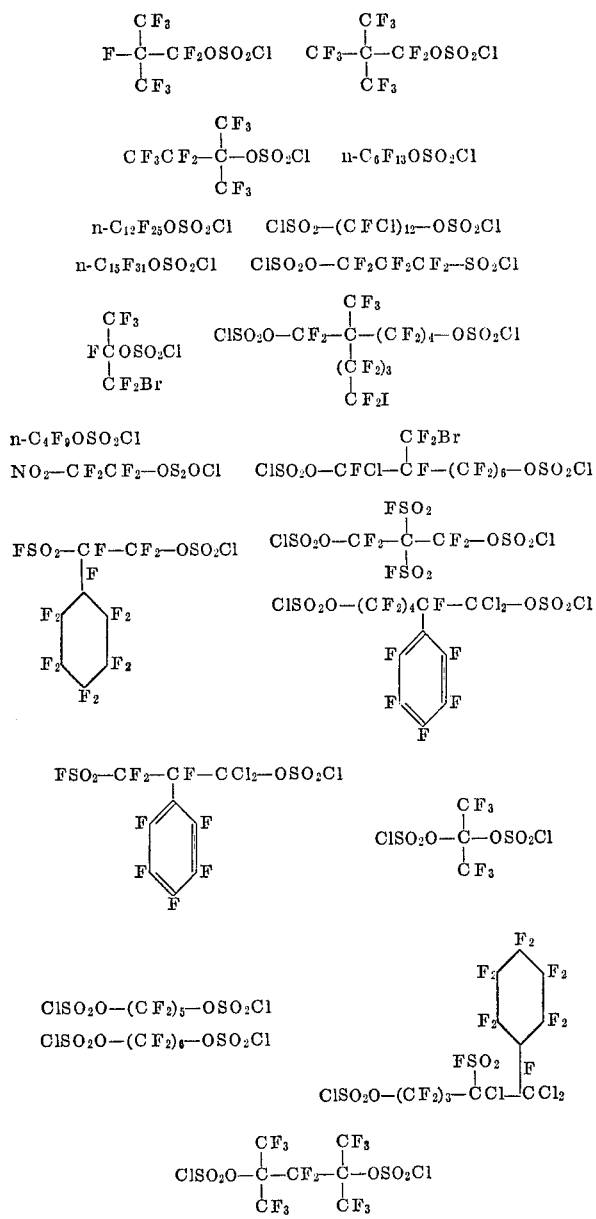

Polyhaloorgano hypochlorite starting materials in which the carbon atom or atoms attached to the —OCl group or groups are each bonded to no more than two carbon atoms, may be prepared by reacting a starting compound containing at least four atoms including one or two carbonyl groups associated other than in an aldehyde linkage, in which the non-carbonylic portion or portions of the molecule comprise open chain YZ-perhaloalkyl groups, or open chain YZ-perhaloalkylene groups, wherein Y and Z are substituents on the perhaloalkyl or perhaloalkylene groups and may be the same or different and selected from electronegative groups unreactive to the —OCl groups, with an inorganic chlorinating reagent containing a chlorine atom in a +1 oxidation state which chlorine atom is attached to a more electronegative element, in the presence of a catalyst comprising a metal fluoride selected from the group consisting of LiF, NaF, KF, RbF and CsF, COF$_2$, acids, acid halides and ketones are examples of suitable non-aldehyde type carbonylic starting materials. The preferred chlorinating reagents are ClF and Cl$_2$O. The preferred reaction temperatures for this reaction range from about —78° C. to about 0° C. The process is disclosed in more detail in copending application Ser. No. 734,515 mentioned supra, the pertinent subject matter of which is hereby incorporated by reference.

Examples A, B and C disclosed in said application Ser. No. 734,515 describe specific compounds which may be used as starting materials. These compounds are illustrative only, and one skilled in the art and based on the teaching and disclosure herein provided may readily prepare additional starting materials.

Example A

A 30-ml. stainless steel Hoke cylinder was charged with 2 grams of dry, finely ground CsF. The cylinder was then fitted with a stainless steel Hoke needle valve. Conventional vacuum techniques using a metal (nickel-Monel)-"Plaskon" (trademark of Allied Chemical Corporation for a polymer of chlorotrifluoroethylene) type fluoropolymer system were used to condense 10 mmol of COF$_2$ and 10 mmol of ClF into the cylinder at about —196° C. The mixture was allowed to warm to —20° C. and was stored overnight at that temperature. A number of runs were combined and fractionated between traps maintained at —140° C. and —196° C. The product under normal conditions was an essentially colorless gas, B.P. —47° C., M.P. —164° C. and was identified as being CF$_3$OCl.

Analysis.—Calcd. for CF$_3$OCl (percent): C, 9.36; F, 47.30; Cl, 29.46. Found (percent): C, 9.92; F, 44.70; Cl. 29.23.

A vapor density determination of the molecular weight of the product gave a value of 120.7 g./mol which is in excellent agreement with the calculated value for CF$_3$OCl of 120.5 g./mol. Infrared and nuclear magnetic resonance spectra analyses produced results which are consistent with the structure of CF$_3$OCl. The yield of the CF$_3$OCl produced was essentially quantitative.

Example B

A 30-ml. stainless steel Hoke cylinder was charged with 3 grams of dry, finely ground CsF. The cylinder was then fitted with a stainless steel Hoke needle valve. Conventional vacuum techniques using a metal-"Plaskon" type system as described in Example A were used to condense 2 mmol of COF$_2$ and 2 mmol of Cl$_2$O onto the CsF. The reaction vessel was then stored overnight at —25° C. The gaseous product had a B.P. of —47° C. It was identical in all respects with that of the CF$_3$OCl material prepared in accordance with Example A. The yield was 50%.

Example C

The procedure of Example B was repeated except that 10 mmol of CF$_3$C(O)F and 10 mmol of ClF were condensed onto 5 mmol of the CsF. As in Example A, a number of runs were made and the products of the runs were combined and fractionated between cold traps. These traps were maintained between —111° C. and —196° C. The product obtained under normal conditions was an essentially colorless gas and was identified as being C$_2$F$_5$OCl.

Analysis.—Calcd. for C$_2$F$_5$OCl (percent): C, 14.08; F, 53.88; Cl, 20.82. Found (percent): C, 14.52; F, 55.72; Cl, 20.44

A vapor density determination of the molecular weight of the product gave a value of 170.9 g./mol which is in excellent agreement with the calculated value for C$_2$F$_5$OCl of 175.0 g./mol. Infrared and nuclear magnetic resonance spectra analyses produced results which were consistent with the structure of C$_2$F$_5$OCl.

Example D

The procedure of Example B was repeated except that 3 mmol of (CF$_3$)$_2$C=O and 3 mmol of ClF were condensed onto 2 g. of the CsF. Fractionation of accumulated product was carried out between —95° C. and —196° C. traps. The product was collected in the —95° C. trap and under normal conditions was an essentially colorless gas boiling at 22° C. The product was identified as being

*Analysis.*—Calcd. for $C_3F_7OCl$ (percent): C, 16.33; F, 60.32; Cl, 16.10. Found (percent): C, 16.40; F, 58.88; Cl, 16.35.

A vapor density determination of the molecular weight of the product gave a value of 220.4 g./mol which is in excellent agreement with the calculated value of 220.5 g./mol. Infrared and nuclear magnetic resonance spectra analyses produced results which were consistent with the above-indicated structure. The yield of product was 95%.

Polyhaloorgano hypochlorite starting materials in which the carbon atom or atoms attached to the —OCl group or groups are each bonded to three carbon atoms (polyhalo tertiary hypochlorites) may be prepared by reacting the corresponding polyhalo tertiary alcohol with ClF. The tertiary polyhalo alcohol precursors are a known class of compounds and can be prepared by standard techniques. Preparation of the polyhalo tertiary hypochlorite starting materials is discussed in more detail in copending application of D. E. Gould et al. entitled "Novel Tertiary Polyhaloalkyl Hypochlorites and Process for the Preparation Thereof," mentioned supra, the pertinent subject matter of which is hereby incorporated by reference.

Reaction temperatures for the novel reaction between the hypochlorite starting materials and $SO_2$ are critical and must be maintained below about 0° C., otherwise the reaction does not take place to give any significant yields of the desired chlorosulfate products. The reaction will take place readily even at very low temperatures, for example, in the order of —80° C. and below. Preferred reaction temperatures range from about —80° C. to 0° C. and still preferably from about —40° C. to —20° C. Depending on the particular starting hypochlorite material chosen, the optimum reaction temperature may vary within the above indicated ranges. Accordingly, the optimum temperature range for a particular reaction can be determined routinely.

Atmospheric, sub- or super-atmospheric pressure may be successfully employed in the practice of the invention process.

The reaction can be carried out with the reactants in liquid or vapor phase. An inert solvent for the hypochlorite starting material may be employed, such as, for example, a halogenated hydrocarbon such as $CFCl_3$.

The stoichiometry of the reaction requires 1 mol of $SO_2$ for each hypochlorite function in the molecule which is converted to the chlorosulfate function. Hence, in the case of monochlorosulfates a 1:1 molar ratio of reactant is required. In the case of bi-chlorosulfates, 2 mols of $SO_2$ per mol of bi-hypochlorite starting compound are required. In order to ensure complete reaction a slight stoichiometric excess of $SO_2$ can be employed. There is no advantage in employing very large stoichiometric excesses of the $SO_2$ retactant although large excesses of the same will not deleteriously affect the reaction.

Materials of construction for the apparatus used for the subject reactions should be inert to the reactants employed. Stainless steel and fluoropolymers, for example, polytetrafluoroethylene, polychlorotrifluoroethylene and glass are illustrations of suitable types of materials.

In the following examples parts and percentages are by weight unless otherwise indicated. Examples 1–5 illustrate the invention. Examples 6 and 7 illustrate the unobvious nature of the invention by examining the results of attempted reactions between the known analogous hypofluorites with $SO_2$.

Example 1

Conventional vacuum techniques using a metal (nickel-Monel) "Plaskon" (trademark of Allied Chemical Corporation for a polymer of chlorotrifluoroethylene) type fluoropolymer system were used to condense 10 mmol of $CF_3OCl$ into a 30 ml. stainless steel Hoke cylinder equipped with a stainless steel Hoke needle valve. A slight excess of $SO_2$ was then vacuum condensed into the cylinder at —196° C. The reactor was allowed to warm to —20° C. and was stored overnight at this temperature. At the end of this period, the reaction mixture was fractionated several times through a —111° C. trap to remove $SO_2$ and a small amount of $COF_2$ formed in the reaction. The materials remaining in the —111° C. trap were separated by gas-liquid chromatography. A 50% yield of $CF_3OSO_2Cl$ (B.P. 50° C.) was recovered. The product was a colorless liquid and was identified by elemental, infrared and nuclear magnetic resonance spectral analysis and by molecular weight determination.

*Analysis.*—Calcd. (percent): C, 6.50; F, 30.85; S, 17.34; Cl, 19.21. Found (percent): C, 6.27; F, 29.88; S, 16.85; Cl, 19.80.

Example 2

The procedure of Example 1 was repeated excepting that 10 mmol of $CF_3CF_2OCl$ and a large excess (3:1) of $SO_2$ were condensed into the stainless steel Hoke cylinder and at the end of the reaction period, the product was fractionated through a —78° C. trap. The product retained in this trap was a colorless liquid and was identified as being $CF_3CF_2OSO_2Cl$ by its characteristic infrared spectra.

Example 3

The procedure of Example 1 was repeated excepting that 10 mmol of i-$C_3F_7OCl$ and a large excess (3:1) of $SO_2$ were condensed into the stainless steel Hoke cylinder and at the end of the reaction period, the product, a colorless liquid, was fractionated through a —78° C. trap. The product retained in this trap was identified as being i-$C_3F_7OSO_2Cl$ by elemental analysis, infrared magnetic resonance spectra analysis.

*Analysis.*—Calcd. (percent): S, 11.25; Cl, 12.48. Found (percent): S, 11.50; Cl, 13.05.

In several experiments repeated as described, yields varied from about 35–60%.

Example 4

The procedure of Example 1 was repeated except that the reactants were mixed at about 0° C. and were stored overnight at this temperature. No significant amount of the $CF_3OSO_2Cl$ product was recovered.

Example 5

The procedure of Example 1 was repeated except that the reactants were mixed at about 25° C. and were stored overnight at this temperature. No ascertainable quantity of $CF_3OSO_2Cl$ was recovered from the reaction mixture.

Example 6

Attempted reaction of $CF_3OF$ with $SO_2$.—Attempts to react $CF_3OF$ with $SO_2$ under the same conditions described in Example 1 were negative. No reaction took place. The reaction temperature was raised to 25° C. and still no reaction took place.

Example 7

Attempted reaction of $C_2F_5OF$ with $SO_2$.—Attempts to react $C_2F_5OF$ with $SO_2$ under the same conditions described in Example 1 were negative. No reaction took place.

We claim:

1. The process for preparing a chlorosulfate of the formula:

wherein $n$ is 1 or 2; R is an open chain YZ-perhaloalkyl group when $n$ is 1 or an open-chain YZ-perhaloalkylene group containing at least three carbon atoms when $n$ is 2, wherein Y and Z are substituents on the R moiety and are the same or different electronegative groups selected from the group consisting of $FSO_2$, $FSO_3$, $NO_2$, halogen, perfluoroalkyl, perfluorocycloalkyl and perfluoroaryl; which comprises reacting a polyhaloorgano hypochlorite starting material of the formula: $R-[OCl]_n$ wherein R and $n$ are as defined above, with $SO_2$ at temperatures below about 0° C.

2. A process according to claim 1 in which the starting material contains a minimum number of fluorine atoms which is at least equal to one half the total number of halogen atoms and electronegative groups present in the molecule.

3. A process according to claim 2 wherein the R group contains from 1–15 carbon atoms.

4. A process according to claim 3 wherein $n$ is 1.

5. A process according to claim 2 wherein $n$ is 2.

6. A process according to claim 3 wherein all halogen atoms in the starting material are selected from the group consisting of F and Cl and wherein the number of fluorine atoms present is at least equal to one half the total number of fluorine and chlorine atoms in the molecule.

7. A process according to claim 6 in which reaction temperatures are maintained between about −80 to 0° C.

8. A process according to claim 6 in which reaction temperatures are maintained between about −40 to −20° C.

9. A process according to claim 6 wherein $n$ is 1, the R group contains 1–6 carbon atoms and wherein Y and Z are both halogen atoms.

10. A process according to claim 6 wherein $n$ is 1, the R group contains 1–3 carbon atoms and wherein Y and Z are both halogen atoms.

11. A process according to claim 6 wherein $n$ is 2, the R group contains 3–10 carbon atoms and wherein Y and Z are both halogen atoms.

12. A process according to claim 6 wherein Y and Z are both halogen, all halogen atoms in the molecule are fluorine, $n$ is 1 and the R group contains 1–6 carbon atoms.

13. A process according to claim 12 wherein the carbon atom attached to the —OCl function of the starting material is bonded to no more than two other carbon atoms.

14. A process according to claim 12 wherein the carbon atom attached to the —OCl function of the starting material is bonded to three other carbon atoms.

15. A process according to claim 6 wherein Y and Z are both halogen, all halogen atoms in the molecule are fluorine, $n$ is 1 and the R group contains 1–3 carbon atoms.

16. A process according to claim 6 wherein Y and Z are both halogen, all halogen atoms in the starting material are fluorine, $n$ is 2 and the R group contains 3–6 carbon atoms.

17. A process according to claim 16 wherein each carbon atom attached to an —OCl function of the starting material is bonded to no more than two other carbon atoms.

18. A process according to claim 6 wherein Y and Z are both halogen, all halogen atoms in the starting material are fluorine, $n$ is 1 and the R groups contain 2–3 carbon atoms.

19. A process according to claim 6 in which the product prepared is $CF_3OSO_2Cl$.

20. A process according to claim 6 in which the product prepared is $C_2F_5OSO_2Cl$.

21. A process according to claim 6 in which the product prepared is $i-C_3F_7OSO_2Cl$.

References Cited
UNITED STATES PATENTS

| | | |
|---|---|---|
| 3,254,107 | 5/1966 | Hauptschein et al. __ 260—456 R |
| 3,238,241 | 3/1966 | Hauptschein et al. __ 260—456 R |
| 3,238,240 | 3/1966 | Hauptschein et al. __ 260—456 R |
| 3,248,419 | 4/1966 | Hauptschein et al. __ 260—456 R |

LEON ZITVER, Primary Examiner

L. B. DeCRESCENTE, Assistant Examiner